United States Patent [19]

Takanashi et al.

[11] Patent Number: 4,607,279
[45] Date of Patent: Aug. 19, 1986

[54] BIAS LIGHT SUPPLY DEVICE FOR COLOR TV IMAGING DEVICE USING COLOR SEPARATION STRIPE FILTER

[75] Inventors: Itsuo Takanashi, Yokohama; Shintaro Nakagaki, Fujisawa; Kenichi Miyazaki, Yokohama; Takashi Kuriyama, Tokyo, all of Japan

[73] Assignee: Victor Company of Japan, Limited, Kanagawa, Japan

[21] Appl. No.: 555,865

[22] Filed: Nov. 28, 1983

[30] Foreign Application Priority Data

Nov. 30, 1982 [JP] Japan .................. 57-181415[U]

[51] Int. Cl.$^4$ ............ H04N 9/077; H04N 9/07; H04N 9/09; H04N 5/228
[52] U.S. Cl. .................. 358/44; 358/43; 358/55; 358/223
[58] Field of Search .......... 350/173; 358/55, 225, 358/41, 43, 44, 47, 50, 52, 223

[56] References Cited

U.S. PATENT DOCUMENTS 3,846,579 11/1974 Takanashi et al. ............ 358/47
4,143,399 3/1979 Nagahara et al. ............ 358/44
4,422,722 12/1983 Higuchi et al. ............ 358/55

FOREIGN PATENT DOCUMENTS 186285 10/1983 Japan ...................... 358/55

Primary Examiner—James J. Groody
Assistant Examiner—Randall S. Svihla
Attorney, Agent, or Firm—Jordan and Hamburg

[57] ABSTRACT

A bias light supply device applies bias light through a color separation stripe filter to a color TV imaging device which generates a multiplex color TV video signal. The bias light supply device is disposed in front of the color TV imaging device and is made up of a bias light source for emitting bias light, and a light conducting member made of acrylic resin or glass to apply bias light from the bias light source to the imaging device through the filter. Arranged parallel to the surface of a photoelectric transducer section, the light conducting member has light inlet portions, reflective portions and light outlet portions and is mounted in an opening formed in a color TV camera casing. All the outer surfaces of the light conducting member, except for the light inlet portions, reflective portions and light outlet portions, are covered with light intercepting members. The quantity and color temperature of the bias light are adjustable. The bias light supply device may reduce afterimages and improve color reproducibility in dark scenes.

12 Claims, 5 Drawing Figures

BIAS LIGHT SUPPLY DEVICE FOR COLOR TV IMAGING DEVICE USING COLOR SEPARATION STRIPE FILTER

BACKGROUND OF THE INVENTION

Reference is made to copending U.S. patent application Ser. No. 555,863 and Ser. No. 555,864.

The present invention relates to a color television (TV) imaging apparatus of the type using an imaging device with a photoelectric transducer section in which a color separation stripe filter capable of generating a multiplex color TV video signal is disposed. More particularly, the present invention is concerned with an apparatus for applying bias light to the imaging device.

A modern color TV camera employs a color TV imaging device in which a color separation stripe filter is disposed in a photoelectric transducer section to generate multiplex color TV video signals. Typical of such color TV cameras is a single tube type color TV camera which uses as its imaging device an image tube having a photoelectric transducer section with a color separation stripe filter on a faceplate, or a single plate type color TV camera whose imaging device is a solid state image sensor having a photoelectric transducer section with a color separation stripe filter. Because such types of TV cameras are easy to produce in a simple, compact and light-weight construction, various types of products with such capabilities are now in the market.

As well known in the art, undesirable afterimage develops in a color TV camera of the type including in a photoelectric transducer section thereof a photoconductive film which shows a photoelectric phenomenon, a kind of internal photoelectric effects. An expedient heretofore employed to reduce afterimage in such an imaging device is applying bias light in an even distribution to the entire surface of the transducer section. Various methods have been proposed for the application of bias light to the imaging device such as (1) building a light source in a lens to apply bias light to the whole transducer surface, (2) locating an annular light source in the vicinity of the transducer section to apply bias light to the whole surface of the latter, and (3) guiding light from a light source located at the rear of the transducer section to the whole transducer surface by utilizing the wall of the image tube or forming a light inlet opening in an electrode of the image tube.

The prior art methods for the supply of even bias light to the entire transducer surface described above commonly employ scattered light, so that the appearance of afterimage may be suppressed while eliminating shading.

The supply of bias light for reducing afterimage is similarly applicable to a color TV imaging device of the type having a photoelectric transducer section which is equipped with a color separation stripe filter for generating a multiplex color TV video signal.

When applied to a color TV imaging device, the prior art bias light supply means discussed as three different methods (1) to (3) are successful to effectively reduce afterimage in the transducer section by applying bias light thereto. However, all the three methods are not fully acceptable in one respect or another. The method (1) fails to offer interchangeability between lenses, the method (2) involves difficulty in reconciling quantity and even distribution of light, and the method (3) is incapable of supplying a sufficient quantity of light.

Another problem encountered with a color TV camera furnished with an imaging device of the type described is that colors in a scene cannot be reproduced with good reproducibility when the scene is dark. While various implementations have been proposed against such poor color reproducibility in dark scenes, we have found that the problem can be solved by processing the bias light in a special manner, as disclosed in Japanese Utility Model Application No. 57-124681 (Japanese Unexamined Utility Model Publication No. 59-29878). The solution we found is to apply bias light which is parallel to a plane defined by an extending direction of an array of stripes in the stripe filter and a direction perpendicular to the surface of the transducer section, using a reflector plate having a parabolic configuration. Utilizing this technique, we readily attained a color TV camera which features favorable color reproducibility even in dark scenes. The theme of our farther study, therefore, has been to embody the above-described technique and develop a bias light supply device which features high productivity and ability for general purpose application.

SUMMARY OF THE INVENTION

It is an object of the present invention to provide a bias light supply device for applying bias light to a color TV imaging device having in a photoelectric transducer section thereof a color separation stripe filter which generates a multiplex color TV video signal, which device is simple in construction, desirable in productivity, and feasible for general purpose applications.

It is another object of the present invention to provide a new bias light supply device for applying bias light to a color TV imaging device which is capable of effectively improving color reproducibility in dark areas.

It is another object of the present invention to provide a bias light supply device which is capable of effectively reducing afterimage in a color TV imaging device.

It is another object of the present invention to provide a generally improved bias light supply device for a color TV imaging device.

A bias light supply device of the present invention is used with a color television imaging device which generates a multiplex color television video output signal and includes a photoelectric transducer section and a color separation stripe filter. The bias light supply device comprises a bias light source for emitting bias light, and a flat light conducting member positioned parallel to a surface of the photoelectric transducer section and including a light inlet portion on which the bias light from the bias light source is incident, a reflective portion having a parabolic section in order to reflect light incident on the light inlet portion, and a light outlet portion for discharging light reflected by the reflective portion whereby the reflected and discharged light proceeds toward a face of the color television imaging device.

The above and other objects, features and advantages of the present invention will become apparent from the following detailed description taken with the accomapnying drawings.

DESCRIPTION OF THE PREFERRED EMBODIMENT

While the bias light supply device for a color TV imaging device of the present invention is susceptible of numerous physical embodiments, depending upon the environment and requirements of use, a substantial number of the herein shown and described embodiment have been made, tested and used, and all have performed in an eminently satisfactory manner.

Figure 1:
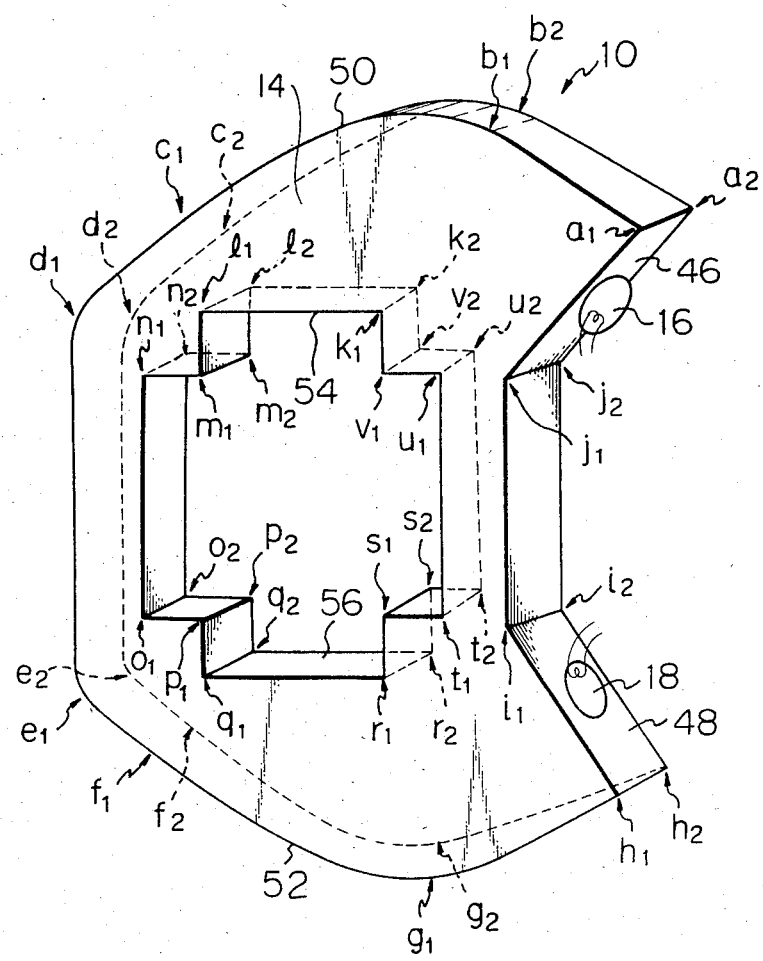
FIG. 1 is a fragmentary perspective view of a bias light supply device for a color TV imaging device embodying the present invention.
Figure 2:
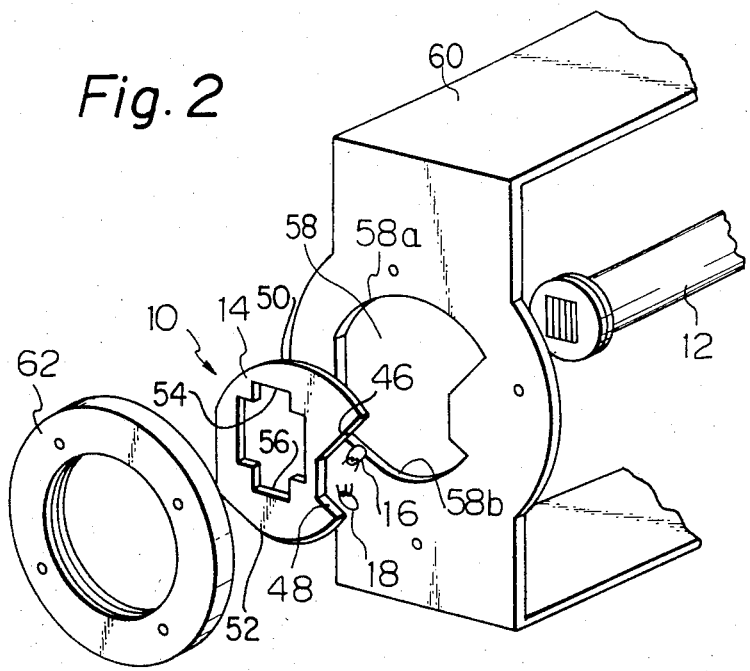
FIG. 2 is a fragmentary exploded perspective view of a color TV imaging apparatus.

Reference will be made to the drawings for describing one embodiment of the present invention. FIG. 1 is a perspective view of essential part of a bias light supply device in accordance with the present invention, while FIG. 2 is an exploded perspective view of part of a color TV imaging apparatus. The apparatus shown in FIG. 2 is a single tube type color TV camera which includes a color TV image tube equipped with a color separation stripe filter in a photoelectric transducer section thereof.

In FIG. 1, the bias light supply device 10 comprises a flat light conducting member or light conductor 14 which is made of a light transmitting material such as acrylic resin or glass. As shown, the light conductor 14 comprises light inlet portions 46 and 48 on which rays emanating from the light sources 16 and 18 become incident respectively, reflective portions 50 and 52 each having a parabolic section for reflecting the light rays incident on the light inlet portion 46 or 48 associated therewith, and light outlet portions 54 and 56 at which the light rays reflected by the portions 50 and 52 leave the light conductor 14. Light from the light source 16 enters the light conductor 14 at the light inlet portion 46 and leaves it as bias light at the light outlet portion 54 reflected by the reflective portion 50. Likewise, light from the light source 18 propagates through the light inlet portion 48, reflective portion 52 and light outlet portion 56, leaving the light conductor 14 as bias light. While two light sources 16 and 18 are shown in the embodiment of FIG. 1, an arrangement may be made such that the two paths for light propagation are supplied by a single light source.

It is a primary requisite that the light rays from the light sources 16 and 18 be directed only toward the light inlet portions 46 and 48 of the light conductor 14, that is, light rays issuing in directions other than that toward the light inlet portions 46 and 48 be prevented from streaming to the outside. This is readily attainable by arranging the configuration of the lamps 16 and 18 themselves or that of a lamp housing (not shown). Meanwhile, the portions of the light conductor 14 other than the light inlet portions 46 and 48, light outlet portions 54 and 56 and reflective portions 50 and 52 are entirely coated black for light interception, so that unnecessary light rays may be prevented from leaking to the outside.

In detail, the black coating for light interception is applied to all the portions other than the light inlet portions 46 (area defined by points $a_1$, $a_2$, $j_2$ and $j_1$) and 48 (area defined by points $h_1$, $h_2$, $i_2$ and $i_1$), light outlet portions 54 (area defined by points $l_1$, $k_1$, $k_2$ and $l_2$), and 56 (area defined by points $q_1$, $r_1$, $r_2$ and $q_2$), and reflective portions 50 (area defined by points $b_1$, $b_2$, $c_2$ and $c_1$) and 52 (area defined by points $g_1$, $g_2$, $f_2$ and $f_1$), i.e., an area defined by points $j_1$, $i_1$, $i_2$ and $j_2$, an area defined by points $b_1$, $a_1$, $a_2$ and $b_2$, an area defined by points $g_1$, $h_1$, $h_2$ and $g_2$, an area defined by points $c_1$, $d_1$, $e_1$, $f_1$, $f_2$, $e_2$, $d_2$ and $c_2$, an area defined by points $k_1$, $v_1$, $u_1$, $t_1$, $s_1$, $r_1$, $r_2$, $s_2$, $t_2$, $u_2$, $v_2$ and $k_2$, an area defined by points $l_1$, $m_1$, $n_1$, $o_1$, $p_1$, $q_1$, $q_2$, $p_2$, $o_2$, $n_2$, $m_2$ and $l_2$, an area defined by a curve interconnecting points $a_1$, $b_1$, $c_1$, ..., $g_1$, $h_1$, $i_1$, $j_1$ and $a_1$ and a curve interconnecting points $k_1$, $l_1$, $m_1$, $n_1$, $o_1$, ..., $t_1$, $u_1$, $v_1$ and $k_1$, and an area defined by a curve interconnecting points $a_2$, $b_2$, $c_2$, $d_2$, ..., $g_2$, $h_2$, $i_2$, $j_2$ and $a_2$ and a curve interconnecting points $k_2$, $l_1$, $m_2$, $n_2$, $o_2$, ..., $t_2$, $u_2$, $v_2$ and $k_2$. The portion to be coated black for light interception may be covered with any suitable light inercepting members.

The flat light conducting element 14 is coupled in an opening 58 which is formed through a wall of a camera housing or box 60, as shown in FIG. 2. The position of the light conductor 14 is such that its opposite major surfaces extend parallel to the surface of the photoelectric transducer section of the image tube (color TV imaging device) 12. Among all the walls which define the opening 58, those 58a and 58b corresponding to the reflective portions 50 and 52 of the light conductor 14 are finished to mirror surface so that the light rays entering the light conductor 14 may be efficiently reflected by the portions 50 and 52 toward the light outlet portions 54 and 56 respectively, when the light conductor 14 is fit in the opening 58. It will be apparent to those skilled in this art that light reflecting films may be evaporated or otherwise deposited on the outer surfaces of the reflective sections 50 and 52.

The opening 58 in the camera casing 60 is of course configured with notches which individually match in shape with the portions of the light conductor 14 where the light sources 16 and 18 are mounted. This allows the light sources 16 and 18 to be accommodated in the opening 58 when the light conductor 14 is coupled thereinto. The reference numeral 62 in FIG. 2 designates a lens mount which is fastened to the camera casing 60 by means of screws. The lens mount 62 is a C-mount.

As previously mentioned, the opposite major surfaces of the light conductor 14 extend parallel to the surface of the photoelectric transducer section of the imaging device 12. Each of the light outlet portions 54 and 56 of the light conductor 14 is oriented such that the light projected therefrom proceeds with a plane which is parallel to the stripes in the color separation filter and perpendicular to the photoelectric transducer section surface, as shown in FIGS. 4 and 5.

Figure 4:
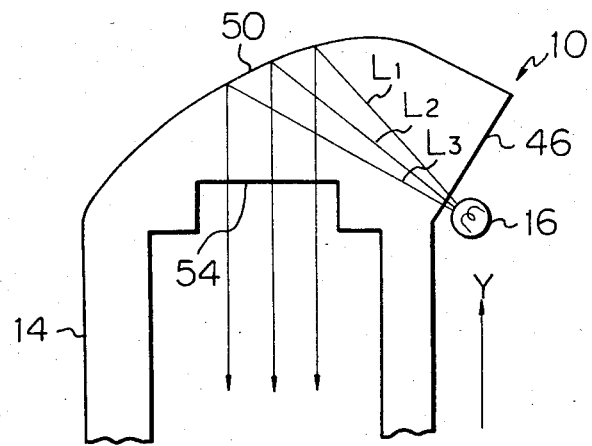
FIGS. 4 and 5 are diagrams illustrating a manner of bias light propagation in a light conducting member of a bias light supply device.
Figure 5:
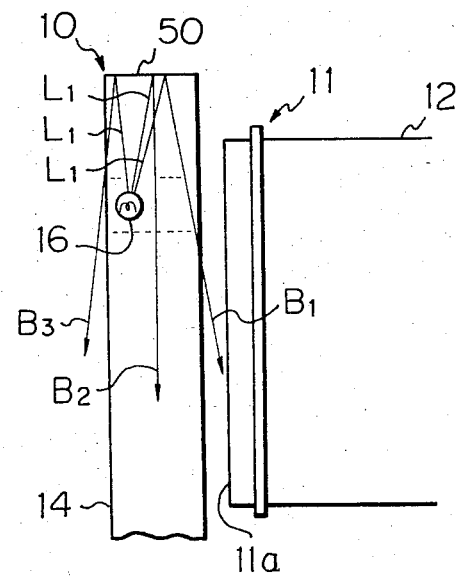

In detail, as shown in FIG. 4, the light source 16 is positioned adjacent to the focus of the parabolic section which constitutes the reflective portion 50 of the light conductor 14. Light rays $L_1$, $L_2$ and $L_3$ emanating from the light source 16 are individually reflected by the reflective portion 50 to be radiated from the light outlet portion 54 (light rays from the other light source 18 are steered in the same manner and, therefore, description thereof will be omitted for simplicity). The light rays coming out from the light conductor 14 respectively propagate along planes which are perpendicular to the sheet surface of FIG. 4 and parallel to a direction Y, that is, parallel to the stripes in the stripe filter and intersecting the face 11a of the transducer section 11 (shown in FIG. 5) at a right angle. FIG. 5 illustrates the propagation of the light ray $L_1$, for example, as viewed from a side of the light conductor 14. As shown in FIG. 5, the light ray $L_1$ reflected by the portion 50 advances in various different directions in the specific plane described above. The reflected light includes a component $B_1$ advancing toward the face 11a of the transducer section 11, a component $B_2$ advancing along the general direction in which the light conductor 14 extends, and a component $B_3$ advancing away from the face 11a of the transducer section 11. In accordance with the present invention, only the light component $B_1$ serves as effective bias light. In order that the specific component $B_1$ may be efficiently routed toward the face 11a of the transducer section 11, it is preferable to, for example, position the light source 16 offset toward the front end of the light conductor 14 as shown in FIG. 5. Where the light source 16 is a lamp, its filament may be disposed in such a manner as to attain the above-described effect. Under this condition, the bias light coming out from the light conductor 14 produces a clear-cut shadow of the filter to be projected on the photoconductive layer, whereby the imaging device 12 is capable of generating a color composite TV video signal as an output signal thereof even when supplied with the bias light only.

The output signal of the imaging device 12 stated above is entirely different from an output signal of a color TV imaging device which appears when scattered light is applied to the entire surface of a transducer section of the imaging device by use of the prior art bias light supply means. That is, a major part of the output signal of the color TV imaging device derived from the prior art bias light supply means is occupied by low frequency range signal components, and the remaining quite small part by high frequency range components. In other words, the output signal originating from the prior art bias light supply means is not a color multiplex signal.

As previously described, in response to bias light applied by the device of the present invention, a color TV imaging device produces a signal which is a multiplex color TV video signal, even when irradiated by the bias light only. Therefore, as in the proposal described in Japanese Utility Model Application No. 57-124681, the device of the present invention is capable of generating a color TV video signal which reproduces a picture with good color reproducibility even if the scene picked up is dark and, particularly, it makes it possible to widen the dynamic range of TV signals in dark areas.

Figure 3:
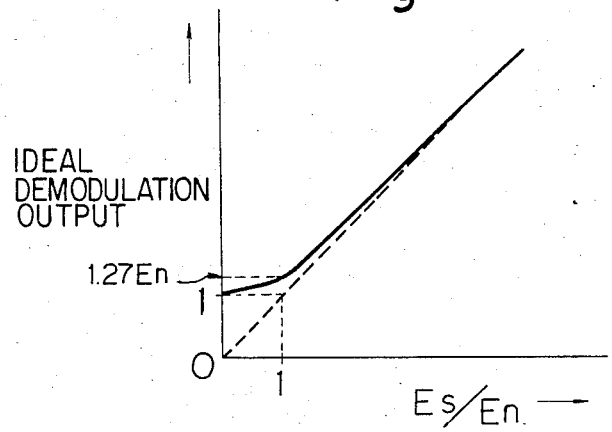
FIG. 3 is a graph showing an exemplary level characteristic curve of a color signal component derived from the carrier color signal of the imaging device.

FIG. 3 shows a level characteristic curve of a color signal component derived from the carrier color signal of the imaging device. In the graph, the abscissa indicates a ratio between a signal component Es and a noise component En each contained in a color TV video signal output from an imaging device and the ordinate, an ideal demodulated signal output. As shown in FIG. 3, when the signal component Es is made smaller than the noise component En, the noise component En comes to govern the demodulated signal so that the signal component Es is compressed to such an extent as to be incapable of appearing as a signal. It follows that, if the bias is so applied as to satisfy the relation Es>En, compression of the signal component will be eliminated to allow a signal to be reproduced even in a dark scene. Therefore, if the quantity of bias light which the device of the present invention applies is predetermined to satisfy the relation Es>En, a color TV video signal with good color reproducibility will be generated in a dark scene. In FIG. 3, the dotted line represents a characteristic which would result from En=0.

In a preferred embodiment, bias light whose color temperature is substantially 3,200°K. may be employed to prevent white balance from being destroyed by a change in the quantity of bias light. In another preferred embodiment, the bias light may be of the kind having a color temperature which enhances a specific color corresponding to a color signal reproduced from a low frequency range signal (e.g. green signal).

Various approaches are available for controlling the bias light coming out from the light outlet portions 54 and 56 of the light conductor 14 to have a desired color temperature. For example, the color temperature of the light sources 16 and 18 may be varied, color temperature conversion filters may be fit on the light inlet portions 46 and 48 and/or light outlet portions 54 and 56 of the light conductor 14, or the light conductor 14 may be colored to serve itself as a color temperature conversion filter.

In summary, it will be seen that the present invention provides a bias light supply device for a color TV imaging device which facilitates production of a color TV camera which features excellent characteristics due to the use of a simple and flat unique light conducting element.

Various modifications will become possible for those skilled in the art after receiving the teachings of the present disclosure without departing from the scope thereof.

What is claimed is:

1. A bias light supply device for use with a color television imaging device which generates a multiplex color television video output signal and includes a photoelectric transducer section and a color separation stripe filter, said bias light supply device comprising:
    a bias light source for emitting bias light; and
    a flat light conducting member positioned parallel to a surface of the photoelectric transducer section of the imaging device and including a light inlet portion on which the bias light from said bias light source is incident, a reflective portion having a parabolic section in order to reflect light incident on the light inlet portion, and a light outlet portion for discharging light reflected by the reflective portion whereby the reflected and discharged light proceeds toward a face of the color television imaging device.

2. A bias light supply device as claimed in claim 1, in which the light conducting member is made of acrylic resin or glass, which are light transmitting materials.

3. A bias light supply device as claimed in claim 1, in which all the outer surfaces of the light conducting member are covered with light intercepting members except for the light inlet portion, the reflective portion and the light outlet portion.

4. A bias light supply device as claimed in claim 1, in which a film for light reflection is deposited by evaporation on outer surface of the reflective portion of the light conducting member.

5. A bias light supply device as claimed in claim 1, further comprising a camera casing formed with an opening for mounting the light conducting member.

6. A bias light supply device as claimed in claim 5, in which a portion of the opening in the camera casing which corresponds to the reflective portion of the light conducting member is finished to a mirror surface.

7. A bias light supply device as claimed in claim 1, in which the bias light source can be adjusted to vary the quantity and color temperature of the bias light.

8. A bias light supply device as claimed in claim 7, in which the color temperature of the bias light is adjusted to be about 3,200°K.

9. A bias light supply device as claimed in claim 7, in which the color temperature of the bias light is adjusted by the bias light source to enhance a color corresponding to a color signal which is reproduced from a low frequency range signal contained in the output signal of the color television imaging device.

10. A bias light supply device as claimed in claim 7, in which the quantity of the bias light is adjusted by the bias light source such that a signal component contained in the output signal of the color television imaging device is greater than a noise components contained in said output signal.

11. A bias light supply device as claimed in claim 1, in which the light conducting member further comprises a color temperature conversion filter disposed on the light output portion.

12. A bias light supply device as claimed in claim 1, in which the light conducting member is colored to constitute a color temperature conversion filter.

* * * * *